INVENTOR.
WOLFGANG B. KLEMPERER
BY
ATTORNEY.

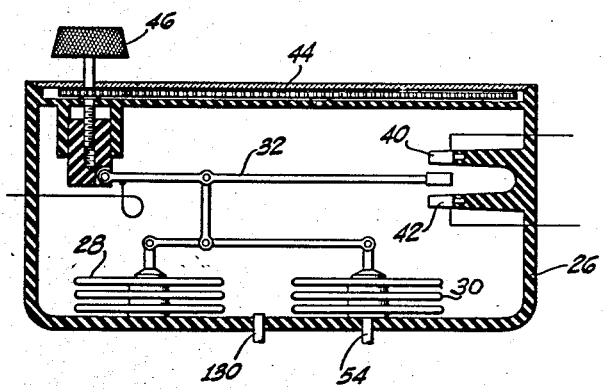
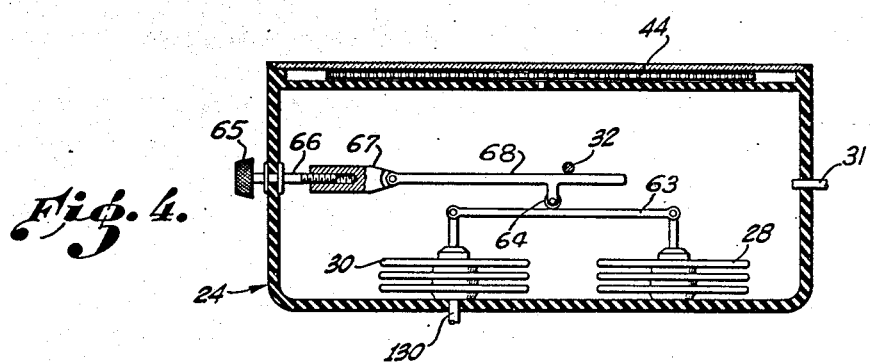
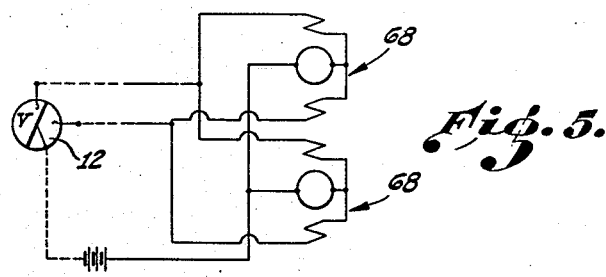

Patented Apr. 17, 1951

2,549,690

UNITED STATES PATENT OFFICE 2,549,690

CABIN PRESSURE CONTROL

Wolfgang B. Klemperer, Los Angeles, Calif., assignor to Douglas Aircraft Company, Inc., Santa Monica, Calif.

Application April 6, 1942, Serial No. 437,921

48 Claims. (Cl. 98—1.5)

My invention relates to aircraft pressure cabins and more particularly to apparatus for controlling and regulating the pressure therein.

Generally, a pressure cabin is a livable compartment, in which the air pressure is artificially controlled and regulated at values usually above the ambient atmospheric pressure prevailing at flight altitude. The pressure cabin is not, as a rule, hermetically sealed, inasmuch as means are required both to take air into and to exhaust air from the cabin in order to maintain a livable pressure while the aircraft flies through high strata of air too thin for safely sustaining respiration. Moreover, these means are capable of reestablishing pressure equalization prior to landing.

If a cabin shell is constructed sufficiently strong to permit sea level pressure to be maintained therein at any altitude the particular aircraft can attain, the only pressure regulation problems are those caused by differences of altitudes at the points of departure and arrival. A cabin so constructed would of necessity be rather heavy and thereby reduce the economic efficiency of the aircraft.

Most aircraft passengers, however, can readily tolerate altitudes in the range of 5,000 to 10,000 feet, and, in view of this fact, it is structurally and mechanically advantageous to design a pressure cabin for a certain moderate pressure differential. It is then desirable to gradually reduce the cabin pressure during ascent at a lesser apparent rate of climb than that of the aircraft, but in a manner such that the permissible pressure differential is never exceeded. Similarly, during descent, the cabin pressure may be gradually raised in order to equal the existing ambient atmospheric pressure shortly before landing.

The principal object of my invention is to provide an aircraft cabin pressure control system which complies with such limitations of permissible pressure differences between the interior of the cabin and the ambient or flight atmosphere as may be dictated by passenger comfort, strength considerations or limitations of compressor power.

Another object is to provide a pressure regulating system which will effect changes in cabin differential pressure inversely proportional to changes in flight altitude pressure of the aircraft.

A further object is to provide a pressure regulating system which will effect changes in cabin absolute pressure directly proportional to changes in flight altitude pressure of the aircraft.

Another object is to minimize the rate of pressure changes to which occupants of the cabin are subjected while the aircraft climbs or descends at a high rate or encounters bumpy air.

Still another object is to provide such a rate of pressure change control means which, subject to a preselected differential pressure limit, will permit or induce a change of pressure within the cabin, whether an increase or a decrease, at a preselected rate and regardless of the change or rate of change of ambient or flight altitude pressure.

Further objects are: to provide a system for controlling the pressure within a cabin; to provide a control for automatically and/or manually regulating the pressure within a cabin; and to provide an altitude-ratio mechanism for controlling the pressure within a cabin.

Still further objects are: to provide mechanism for minimizing the rate and/or degree of cabin pressure changes; to provide adjustable mechanism for setting the altitude above which the pressure cabin shall operate; and to provide a relatively rugged, inexpensive, and efficient cabin pressure control system.

Other and further objects will become apparent as the description proceeds.

For a clearer understanding of my invention, reference may be had to the drawing in which:

Fig. 3 is a sectional view of another embodiment of a cabin pressure regulator;

Fig. 4 is a sectional view of a third embodiment of a cabin pressure regulator.

Fig. 5 is a schematic diagram of an outlet valve limit switch system for controlling blower air delivery;

Figure 1:
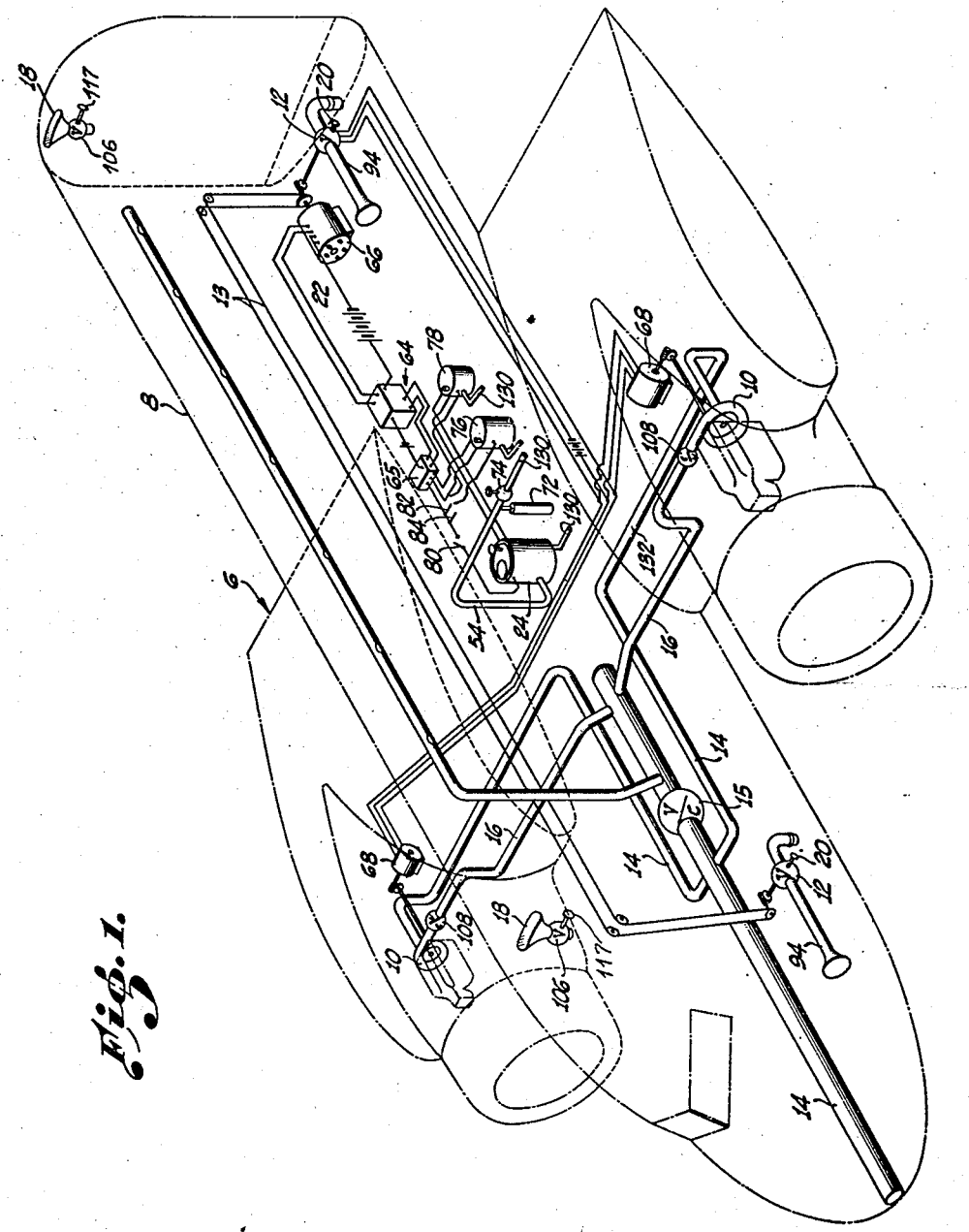
Fig. 1 is a perspective schematic view of an embodiment of my cabin pressure control system, a fragmentary portion of the aircraft being shown in phantom.

Referring now to the drawings, an airplane 6 having wings, fuselage, control surfaces, power plant, etc. is equipped with a cabin 8 adapted to withstand a desirable pressure differential or, in other words, to be supercharged. Pressure in the cabin is supplied by one or more blowers 10 and is regulated primarily by one or more controlled cabin air outlet valves 12 which may be connected, as shown, by a cable 13 for simultaneous operation. The blowers receive fresh air preferably from the nose of the fuselage through a ram duct system 14, and deliver compressed air to the cabin through ducts 16 or a conventional heating and ventilating system. The duct system 14 comprises three conduits, two of which lead directly to the blowers 10, and the other one leads directly to the cabin duct system. The latter conduit is the largest of the three and incorporates a check valve 15 which is adapted to close the aft portion of this duct to incoming air as soon as the blowers begin operating and build up a pressure in the cabin greater than the flight ram pressure. In fact, my invention is such that there need be no difference in the distribution of fresh air or its temperature control mechanism, whether or not the cabin is supercharged. In order to accomplish supercharging or pressurizing, however, it is necessary that the cabin, cabin air exhaust valves, ducts and other associated parts be designed to withstand a pressure difference.

The controlled cabin air outlet valves 12, 12 are supplemented by larger overhead exhaust outlets 18 for discharging sufficient vitiated air from the cabin and lavatories in unsupercharged flight. These large outlets are especially needed to insure ample ventilation in hot weather. While I have shown only two controlled cabin air outlet valves 12, 12, there may be three or more in a passenger airplane, depending upon the cabin size, and these may be interconnected by suitable mechanism so as to act partly in series, partly in parallel. A plurality of these valves, differently located, is advantageous because, when flying supercharged, it is desirable to exhaust the air mostly from the lavatories or dressing rooms which may be situated at opposite ends of the cabin.

When ascending, and desiring to supercharge, the large outlets 18 are closed and the quantitative outlet control is turned over to the smaller valves 12, 12 which can be more accurately regulated and which preferably discharge into such unsupercharged fuselage portions as baggage and cargo compartments, thereby not only heating these portions but also precluding the possibility of icing occurring in the outlets. The control of the valves 12, 12 can be operated manually as by a handle 20 in case of emergency, but normally this control is effected automatically by a servo system, broadly referred to as 22, which is responsive to or controlled by a cabin pressure regulator 24.

The present preferred embodiment of such a cabin pressure regulator is, in effect, an altitude-ratio control which tends to regulate or change the cabin absolute pressure directly proportional to changes in ambient flight pressure. In most cases, a flight schedule is prepared before take-off wherein is determined the altitudes which the airplane will attain and the altitudes at which the airplane will cruise, and the cabin pressure regulator can be adjusted accordingly to set the cabin supercharger system in operation when desired. Up until the time the supercharger system begins operating, the cabin pressure and flight pressure are substantially equal and the altitude set on the regulator is then the line of demarcation from an equalized pressure condition inside and outside the cabin. This set altitude may then be termed the equalizing altitude from which the pressure differential is built up as the airplane ascends.

The regulator 24 comprises a case 26, the interior of which is subjected through the conduit 130 to the absolute pressure within the aircraft cabin. The case 26 houses a pair of coaxially mounted pressure sensitive units 28 and 30. The unit 28 is an evacuated bellows or aneroid and is responsive to changes in the cabin absolute pressure. The unit 30 is a capsule exteriorly subjected to cabin pressure while the interior thereof is connected by conduit 31 to ambient flight pressure. This capsule thus is responsive to changes in the difference between cabin absolute pressure and ambient flight pressure that is responsive to changes in cabin differential pressure.

A contact arm 32 is pivotally connected at its one end 34 to a bracket 36 fixed to an inner wall surface of the case 26. This arm is also pivotally connected intermediate its ends at 38 to an extension coaxially carried by the aneroid 28. The free end of the contact arm 32 is disposed between a pair of spaced contacts 40 and 42 and this end as the arm is pivotally moved because of expansion or contraction of the pressure responsive units 28 and 30, will move between and into engagement with one or the other of the spaced contacts 40 and 42.

To indicate the regulator setting a scale 44, together with an index, not shown, is provided on the face of the instrument. Adjustment of the regulator, that is the setting of the equalizing altitude, is accomplished by a knob 46 fixed to the outer end of a small shaft 47 rotatably carried by the one wall of the case 26. The inner end of the shaft 47 is threadedly engaged in a tapped opening formed in the one wall of a slide member 48 held against rotation. The slide member 48 carries the contacts 40 and 42 and it will be seen that as the shaft 47 is rotated the slide member 48 will move in one direction or the other depending upon the direction of rotation of the shaft 47. This movement of the slide member 48 obviously will vary the position of the contacts 40 and 42 relative to the end of the arm 32 disposed between the same. The scale 44 is formed about its edge face as clearly shown in Figure 2 with a plurality of teeth to permit the scale to be driven through the pinion shown mounted to the shaft 47.

Figure 2:
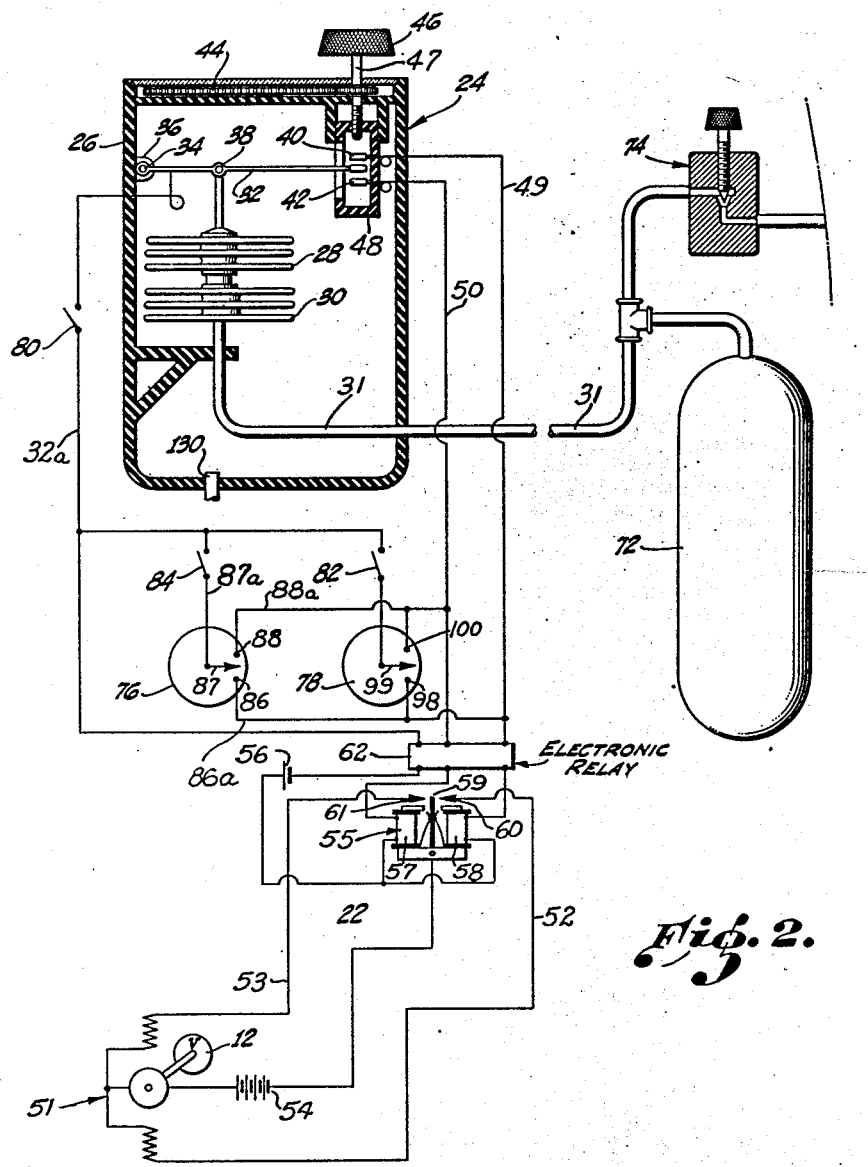
Fig. 2 is a partially sectional and partially schematic view of components of the pressure control system including a cabin pressure regulator, lag control, cabin rate of climb meter, cabin altimeter, and the electrical system for controlling cabin outlet valves.

While I have shown in Figure 2 the preferred embodiment of the regulator 24, the arrangement may also be such that the contacts 40 and 42 are fixed and the fulcrum of the lever arm 32 adjustable relative thereto, as shown in the form of the regulator illustrated by Figure 3.

In addition to this embodiment, there are at least two other interchangeable and feasible adaptations of the two pressure sensitive units 28, 30, the common feature of all three being that cabin pressure, flight altitude pressure and their difference are effective upon the instrument. One of these other adaptations is shown in Fig. 3, wherein the units 28, 30 perform the same function as in Fig 2 but are no longer superposed and therefore may be of different sensitivity as will be later explained. The third adaptation is shown in Fig. 4 wherein the unit 28 is of the same type as in Figs. 2 and 3, that is an aneroid, but is now responsive to flight altitude pressure, and the unit 30 is a pressure capsule exposed to the pressure differential between flight altitude pressure and cabin absolute pressure, the flight altitude pressure being connected into the regulator case through the conduit 34 and the cabin pressure being connected to the interior of the unit 30 by the conduit 130.

If an altitude ratio control of, say, 1 to 2 is desired, that is, cabin pressure controlled substantially halfway between flight altitude pressure and equalizing altitude pressure, and if the sensitivity of the two regulator units is alike, they can be merely superposed as shown in Fig. 2. If, however, the sensitivity is not the same, a lever system such as that shown in Fig. 3 must be introduced for connecting the units 28, 30 to the lever arm 32 in order to obtain the desired 1 to 2 ratio.

The regulator in effecting control of cabin absolute pressure performs three functions, one at a time; it may energize a valve closing circuit 49 of the servo system when an increase in cabin pressure is needed; or it may energize a valve opening circuit 50 of the servo system when calling for a decrease of cabin pressure; or it may energize neither the increase nor decrease circuits when the cabin pressure is substantially the pressure called for by the predetermined ratio of flight altitude pressure to cabin pressure.

The regulator 24 controls the servo system 22 through the arm 32 as the same is pivotally moved in response to the changes in the pressures to which units 28 and 30 are subjected. This control action is effected by the end of the lever 32 which is moved into and out of engagement with the spaced contacts 40 and 42. The contact 40 forms a part of the valve closing circuit 49 while contact 42 is connected into and forms a part of valve opening circuit 50. The arm 32 is electrically connected to a lead 32a which may be called the grounding conductor for the regulator 24.

The servo system includes an electric motor 51 of the reversible split field series type adapted to drive, in either direction, suitable gear trains operatively connected to move the valves 12. The motor 51 may be operated by energization of either a field coil circuit 52 or a field coil circuit 53 from some suitable power source such as a battery 54 to open or close the valves 12 depending upon the direction of rotation of the motor.

As will be hereinafter shown, the directional control of the motor and consequently the valves 12 may be effected through movement of the contact arm 32 as it is pivotally moved because of contraction or expansion of the pressure units 28 and 30 in response to changes in the pressures to which these units are subjected.

The servo system 22 also includes a relay 55, which is essentially a power amplifier in that very small currents from a battery 56 can be used to bring about a flow of relatively large current in the motor field circuits 52 and 53 respectively. The relay 55 comprises two field coils 57 and 58 connected respectively to the control circuits 50 and 49. Energization of the control circuit 49 and its associated coil 58 will cause the armature 59 of the relay 55 to move into engagement with a contact 60 connected into the motor field circuit 52 to energize the same. Energization of the field coil circuit 52 causes the motor 51 to drive the discharge valves 12 towards closing position and similarly energization of the control circuit 50 will cause the armature 59 to move into engagement with a contact 61 of the field coil circuit 53 to result in energization of that circuit to bring about opening movement of the discharge valves 12. The two centering springs not only hold the armature 59 in the balanced or central position as shown in Figure 2 in which neither control circuit is energized, but are also effective to move the armature 59 into its center position whenever both control circuits are simultaneously energized.

To prevent overloading of the contacts forming a part of control circuits 49 and 50, an electronic relay schematically indicated at 62 may be used.

At high altitude the position of the outlet valves can serve to indicate the air flow rate. Consequently a servo control can be attached to the outlet valve mechanism to be actuated when the valves open or close beyond two or more set stations. A motor 68 actuated by this control is provided for each blower 10 to decrease or increase the flow of fresh air by more or less throttling the flow or by slowing down or speeding up the blowers.

The principle of operation of all embodiments of the regulator herein shown and described are the same. For example, if the equalizing altitude of the instrument is set at 2000 feet, the contact arm 32, so long as that altitude is not exceeded, will be held by the aneroid 28 in engagement with the contact 42. Engagement of the arm 32 with this contact, it will be remembered, results in energization of the valve opening relay coil so that the valve 12 will be held open to equalize cabin pressure with ambient flight pressure during ascent of the airplane from a landing field to an altitude of 2000 feet. As the aircraft approaches 2000 foot altitude, the aneroid 28 in expanding will move the contact arm 32 out of engagement with the contact 42 and as the 2000 foot altitude is reached the now further expanded aneroid will move the arm into engagement with the contact 40. When the arm 32 is engaged with the contact 40, the valve closing relay is energized to bring about closing movement of the valve 12. As the valve is moved toward its closed position, cabin absolute pressure will consequently increase and the increasing pressure tends to collapse the aneroid 28 to move the contact arm 32 away from contact 40. Disengagement of the arm 32 from contact 40 arrests further movement of the valve and if cabin absolute pressure falls below the equalizing pressure of 2000 feet, as the aircraft ascends beyond that altitude, the arm 32 will again move into engagement with the contact 40 to again increase cabin absolute pressure. It will thus be seen that the aneroid 28 seeks to maintain cabin absolute pressure substantially that of the preselected equalizing altitude as the aircraft ascends beyond that altitude.

If the aneroid 28 was the only instrument controlling operation of the valve 12, cabin pressure would be maintained substantially constant under the control of that instrument. The differential pressure capsule 30, however, is also operatively connected to control the valve 12 and once the aircraft has ascended beyond 2000 feet altitude, increasing cabin differential pressure brings about a collapsing movement of the differential capsule 30 in opposition to the force produced by the expanding aneroid. It will thus be seen that the position of the arm 32 is conjointly controlled by the aneroid 28 and the differential pressure responsive capsule 30 to so vary the rate of air discharge from the cabin that cabin absolute pressure changes in direct proportion to changes in ambient flight pressure.

High rates of climb or descent of the airplane may be encountered when the pilot maneuvers over or under clouds, or when vertical air currents in an unstable atmosphere carry the airplane up or down; then even the fractional rate of climb or descent apparent in the cabin, as governed by the pressure regulator, may be too rapid for physiological comfort. To avoid this a lag control incorporated in the flight altitude pressure conduit 31 makes it possible to produce a lag between the change of flight altitude pressure and cabin pressure. This control consists of a thermally insulated air volume bottle 72 and a needle valve 74. The bottle 72 functions to decrease the pressure sensitivity of the ambient pressure in the conduit, the thermal insulation preventing sudden cabin temperature variations from inducing erratic air pressure variations within the bottle. The valve 74 controls the amount of opening in the conduit 31 and consequently the amount of response to flight pressure changes on the part of the unit 30. When the lag valve is wide open no lag in pressure change is effected and the unit 30 follows quickly the outside pressure changes at the flight pressure to cabin pressure ratio. If the lag valve is tightly closed, the flight pressure unit 30 of the regulator becomes inoperative, the regulation then tending to maintain constant absolute cabin pressure. When the lag valve is partly closed, the action is intermediate and the cabin pressure will eventually follow flight altitude pressure changes toward the predetermined ratio, but with some lag inasmuch as the air can but slowly escape into or out of the regulator until considerable back pressure develops. Thus, sudden flight altitude changes of short duration are smoothed out and kept from appreciably affecting the cabin pressure, whereas prolonged altitude changes will be followed eventually.

As previously mentioned, it is possible to vary the ratio of cabin pressure to flight pressure control within reasonable limits. One method of accomplishing such a ratio change is illustrated in Figure 4. In the ratio control instrument of this embodiment, an adjustable fulcrum is provided between the lever arm 32 and a connecting rod 63 pivotally inter-connecting the pressure responsive units 28 and 30. The fulcrum adjusting mechanism may comprise a roller 64 adapted for rolling movement along the rod 63 to thus vary its position relative to the lever arm 32. The roller is actuatable by a knob 65 carried by a stub shaft 66 rotatably extending through the case of the regulator. The inner end of the shaft 66 is threadedly engaged in a bore of a boss 67 pivotally connected to the push-pull rod 68 carrying the roller 64. The principle of such a ratio changing mechanism is to vary the relative effectiveness of the pressure units 28 and 30 which principle obviously may be accomplished in various ways.

Figure 6:
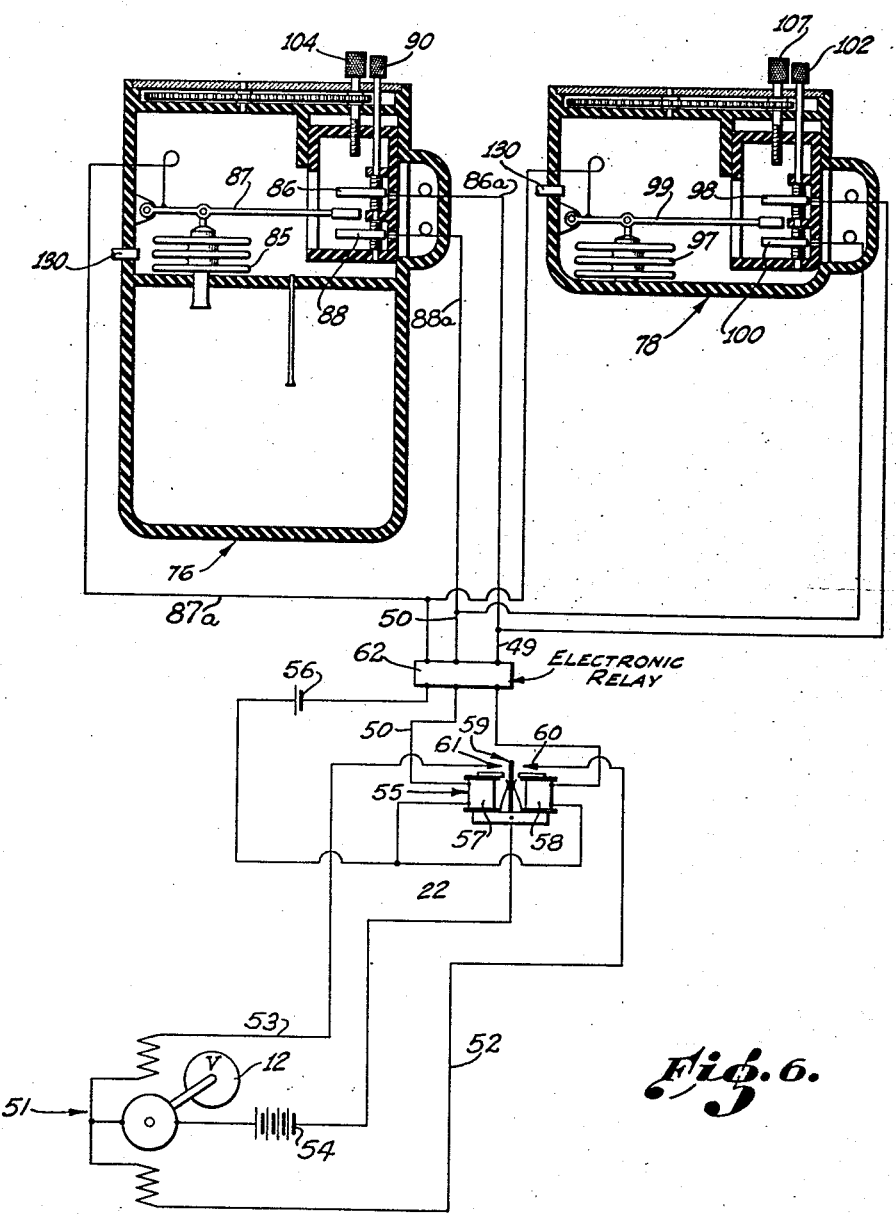
Fig. 6 is a partially sectional and partially schematic view of a pressure regulating system including a cabin rate of climb meter and a cabin altimeter, the cabin pressure regulator of Fig. 2 being rendered inoperative in this embodiment.

The system thus far described is sufficient to accomplish certain of the objects of the invention. However, I have also incorporated in the system a cabin rate of climb meter 76 and cabin altimeter 78 which may be used at will to make supercharging functions more flexible under certain operating conditions. The cabin rate of climb meter may be used in conjunction with the cabin altimeter to accomplish supercharging more or less manually, in which case the regulator 24 is disconnected from the electrical hookup by a switch 80 and the system then is essentially as depicted by Fig. 6. This system will be later described.

In addition to this, the cabin rate of climb meter 76 may be used in conjunction with the lag valve 74 and for a similar purpose, in which case the cabin altimeter is disconnected from the electrical system by a switch 82. The cabin rate of climb meter 76, fully illustrated in Figure 6 but only schematically shown in Figure 2 is exposed to cabin pressure and is connected into the electrical hookup by a switch 84. The meter is of the conventional type except that its pressure sensitive unit, designated by the numeral 85, is adapted to actuate a lever 87 instead of an indicating needle. Also, a pair of spaced electrical contacts 86, 88 are provided, the separation of which can be adjusted by a knob 90. When the contacts are widely separated, the meter does not interfere with quick response of the cabin pressure to flight altitude pressure changes in that the lever is unable to touch either of the contacts 86, 88 before an extensive change has taken place. However, when the contacts are closely adjusted, the meter does interfere because the lever touches one or the other of the contacts more quickly depending upon the distance between them, thereby opposing any rapid cabin pressure changes.

In addition to the possible adjustment of the contacts relative to each other by means of the knob 90, another knob 104 is adapted to move both contacts relative to the lever, and this knob is geared to the rate of climb meter dial for setting the desired rate of climb or descent. Contact 86 may be termed the cabin climb or pressure decrease rate limit contact, and 88 the cabin descent or pressure increase rate limit contact, the device being so arranged in the outlet valve control system, as shown in Fig. 2, that in the event of regulator 24 demanding an increased cabin pressure and the rate of climb meter 76 demanding a lower pressure, relay 55 will balance and open both circuits, thereby stopping or damping the valve action in response to the speed of climb or descent. For example, if it is desired to adjust the equalizing pressure of the regulator 24 to a higher equalizing altitude, the outlet valves 12, 12 would immediately begin opening in order to seek the new ratio between cabin pressure and flight altitude pressure. As the cabin pressure rises, the rate of climb meter 76, being responsive to the rate of cabin pressure change, will actuate the system through the cabin climb limit contact 86 if the rate of ascent is in excess of the set limiting rate of climb, which limit is determined by the distance that the ascent limit contact is set from zero. This would in turn cut out the valve opening circuit of the outlet valve control. Conversely, if the equalizing pressure setting of the regulator is lowered, the system is actuated by the cabin descent limit contact of the meter when the rate of descent is excessive, and the valve closing circuit is cut out.

To more fully explain the operation of the rate of climb meter 76 in the system disclosed in Figure 2, it will be seen that contact 86 is electrically connected to the control circuit 49 by a lead 86A. The contact 88 and the control circuit 50 are electrically interconnected by a lead 88A. As the lever arm 87 is electrically connected by a lead 87A to the grounding conductor 32A, it will be seen that the meter 76 can also control energization of the relay 55.

If in any flight of the aircraft, the ambient flight pressure is increasing or decreasing at such a rate that the regulator 24 in effecting its ratio control brings about a rate of pressure change within the cabin in excess of the preselected rate of change, the rate of climb meter 76 can override the regulator 24. For example, if the arm 32 of the regulator has been moved into engagement with the contact 42 to energize the coil 57 of the relay 55 to bring about opening movement of the valves 12 and the pressure within the cabin begins to decrease at a rate in excess of the preselected one, the arm 87 of the meter 76 will move into engagement with the contact 88 and thus also energize the coil 58 of the relay 55. As previously explained, the centering springs, when both coils of the relay 55 are energized, will move the armature 59 into its center or balanced position between the contacts 60 and 61. This movement of the armature obviously results in de-energization of the motor field circuits 52 and 53 to arrest further movement of the valves 12 and consequently further increase in the rate of pressure change within the cabin.

It can also be pointed out that if the contact arm 32 is disposed between, that is, engaging neither of the contacts 40 and 42, the rate of climb meter can then act as a primary control and will bring about movement of the valves 12 to prevent a rate of pressure change in excess of the preselected one.

Both the manually operated lag mechanism and the cabin rate of climb meter are utilized for causing the cabin pressure to follow the flight altitude pressure in a ratio reduced from the predetermined regulator controlled ratio if the flight altitude change is too rapid for physiological comfort. Both these lag devices may be used simultaneously in flight altitude communication to the regulator, thereby providing not only a positive rate of climb and descent limit or pressure decrease and increase limit, but also a nominal lag for substantially eliminating cabin pressure changes during temporary and rapid flight altitude pressure changes. Either lag or damping device can be set before take-off and reset at any time during flight.

As previously stated, in order to control the supercharging of the cabin more flexibly than is possible with the automatic regulator 24, the electrical control circuit can be opened by switch 80, whereupon the regulator 24 is rendered inoperative, and the cabin altimeter switch 82 and rate of climb meter switch 84 are closed, the system then conforming with Fig. 6.

The altimeter used is of the conventional type except that its pressure sensitive unit, designated by the numeral 97, is adapted to actuate a lever 99 instead of the indicator needle ordinarily incorporated in similar instruments. This lever is provided to close the electrical circuits at contacts 98—100, the separation of which can be adjusted by a knob 102. The operating principle with respect to the lever and the contacts is identical with that of the rate of climb responsive unit, the difference between the two being that the rate of climb unit limits the rate of increase and decrease of cabin pressure, whereas the altimeter controls the maximum and minimum pressures in the cabin depending on the setting of the contacts relative to the lever 99. In addition to the possible adjustments of the contacts relative to each other by means of the knob 102, a knob 107 is provided to adjust both contacts relative to the lever. This latter knob is geared to the altimeter dial for setting the contacts to the desired altitude. The term altitude in this instance, however, is used as referring to cabin pressure in that if the altimeter dial is set at 10,000 feet, the unit will maintain a pressure in the cabin corresponding to that found at 10,000 feet altitude in standard air even though the actual flight altitude may be, for example, 12,000 feet.

The cabin rate of climb meter now functions to limit the cabin rate of climb or descent or pressure decrease or increase until a cabin pressure equivalent to the altitude previously set on the altimeter is reached, whereupon the altimeter will halt the climb or descent and tend to maintain the cabin pressure constant to that altitude. In other words, although the system is attempting to induce a change in cabin pressure independently of the actual flight path of the aircraft, the cabin rate of climb meter actuates the decrease and increase servo systems at the set rate of speed, as the airplane climbs and descends until the desired pressure altitude, as selected on the altimeter, is reached. When this altitude is reached, the altimeter will open or de-energize the decrease circuit if the airplane is ascending, or cut out the increase circuit if the airplane is descending. No ratios are used in this mode of supercharger control, nor are any pressure sensitive units necessary other than those customary in conventional rate of climb meters and altimeters. In fact, this embodiment may be described as effecting a climb schedule control as distinguished from the previously disclosed altitude ratio control.

Before such a climb schedule controlled supercharged flight, the cabin altimeter upper limit contact 98 is set by the knob 107 to the maximum desired cabin pressure altitude, say, 10,000 feet, and the contacts on the cabin rate of climb meter are set by means of a knob 104 to a definite value, say, 300 feet per minute. While the airplane is climbing, and the supercharging system is functioning, the cabin pressure will decrease at the set rate until the set pressure altitude is attained, at which time the altimeter lever 99 will connect with contact 98 and, through the servo system, will maintain the desired pressure.

When the cabin pressure conforms with the pressure altitude setting the cabin rate of climb meter contacts 86, 88 may be set to zero rate of climb and the lower altimeter limit contact 98 and the higher altimeter limit contact 100 may be set close together by means of the knob 102, thereby substantially preventing any cabin pressure fluctuations in that the levers 87 and 99 would immediately connect with one or the other of their respective contacts and operate the valve control through the servo system.

When ready to descend, the lower altimeter limit is reset to an altitude slightly above the field of destination and the cabin rate of climb meter contacts are set to the desired rate of descent or cabin pressure increase. While the airplane is descending, the cabin pressure will gradually rise to and linger at the pressure of the set altitude until the flight altitude reaches the same level, at which time the supercharging system is turned off and the cabin is opened to ambient atmospheric pressure.

It will thus be seen that the system of the present invention will in fact induce a pressure change within the cabin even though the aircraft may be flying in level flight. This is possible with all embodiments of the system disclosed for, as previously explained, whenever the regulator 24 or the altimeter 78 is reset in flight the cabin pressure will tend to reach as quickly as possible the reset pressure value, but is prevented from rapidly changing because of the action of the rate of climb meter 76. Whether the rate of climb meter 76 is connected into the system so as to act as a vetoing or over-riding instrument or it is so connected that it acts as a primary control instrument, it is always operative to limit the rate of pressure change within the cabin to the preselected rate.

A number of safety features must be observed in an aircraft cabin pressure regulation system to insure passenger comfort and operation safety. For example, safety valves 106 are provided in the large exhaust outlets 18 and are set to relieve if the pressure differential exceeds the design limit. Such differential pressure responsive valves have been heretofore used to limit cabin differential pressure and one such valve is shown in Figure 2 of the United States patent to Gregg No. 2,002,057. A valve of this type may also be arranged to cut out the fresh air flow increase control and/or the outlet valve closing circuit. Non-return valves 108 are provided in the supercharger delivery ducts to prevent reverse flow in event of a compressor failure. A check valve 15 is arranged to open and thus prevent any appreciable suction in the cabin when the airplane descends to altitudes below the pressure equalization altitude. This valve is preferably located in the ram duct wherein upon starting to supercharge it will close as soon as the cabin pressure exceeds the ram pressure.

The operation of the automatic pressure differential supercharging system as controlled by the regulator 24 will now be described.

Before beginning a supercharged flight, the operator determines the maximum altitude the airplane will or may attain, say, 17,000 feet, and from this he determines the pressure altitude at which he may supercharge the cabin while at maximum flight altitude without reaching the permissible pressure differential of, say, 3 pounds per square inch between cabin pressure and flight altitude pressure, and yet obtain a high value of passenger comfort. With this maximum differential pressure, in the particular example above given, the cabin pressure altitude would be 9,000 feet. He then determines the equalizing altitude to which he may set the regulator, assuming that the altitude ratio incorporated in the regulator was already fixed at, say, 1 to 2, for the normal flight conditions over his route. In the case of the above example, this equalizing altitude would result as 2×9000—17000=1000. If the operator does not wish to begin supercharging at this altitude, perhaps because his take-off or landing field may already be situated higher, say, at 1500 feet, then he will set his equalizing altitude slightly higher, say, at 2000 feet, and the cabin will then attain a slightly higher apparent altitude, for example, 9500 feet, when the airplane reaches its peak altitude of 17,000 feet.

If the cabin rate-of-climb meter is connected into the system, this should be set as previously described to the desired maximum rate of climb and descent or pressure decrease and increase. These settings may be changed at any time in flight.

As the airplane ascends to the equalizing altitude, the blowers 10 are turned on and the large cabin exhaust outlets 18 are closed, the controllable outlets 12, 12 remaining wide open. The lag valve 74 is usually set to minimum lag or fully open.

When the equalizing altitude is reached, the pressure regulator begins to move the outlet valves and, with increasing flight altitude, these valves gradually move toward closed position. The cabin pressure differential rises and when it surpasses ram duct pressure the ram duct check valve 15 closes.

As the airplane is leveled off for cruising at relatively high altitude, the cabin pressure remains substantially constant at the predetermined ratio between flight altitude pressure and the set equalizing altitude pressure. The damping controls may be set to greater sluggishness to minimize unintentional cabin pressure changes as the airplane encounters rising and descending air currents, or the cabin-rate-of-climb meter may be set to lower limits of climb and descent or pressure decrease and increase.

For normal descent, the damping controls are reset to low lag in order to allow the cabin rate of descent or pressure increase to follow the flight rate of descent at the predetermined ratio. During descent, if the cabin climb meter is inoperative, the lag should be adjusted to sluggish when a temporary high rate of descent of the airplane is planned. However, if the climb meter is operative, the lag valve may be left fully open and the rate-of-climb meter will restrain the cabin descent or pressure increase to the set rate. When the set equalizing altitude is reached, the valve outlets 12, 12 are open, the ram duct check valve 15 opens, the blowers are shut off and the large cabin exhaust outlets 18 are opened.

Various departures from normal operation are feasible and are left to the discretion of the operator when he is confronted with unusual conditions. For example, in climbing it may be desirable to delay starting the blowers until after the set equalizing altitude pressure has been passed, in which case the damping of the regulator should be adjusted to sluggish or the climb limits set low while the cabin pressure temporarily increases to its called for value. When the cabin pressure finally begins to decrease, the lag adjustment and/or the climb meter should be reset to allow the normal flight schedule to be followed. The operator may also decide to land supercharged, in which case he may reset the equalizing altitude slightly below the field of destination and reduce the pressure slowly while taxiing.

My pressure regulation system is essentially automatic while supercharging and therefore requires none other than normal attention. However, manual emergency control is available at any time and any degree of semi-automatic control can be adopted if desired; one method being the variation of the equalizing altitude setting and another by hand manipulation of the outlet valves. Also the regulator 24 may be switched off and the pressure controlled by the rate of climb meter and the altimeter as previously described.

While I have described my invention in its present embodiments, it will be obvious to those skilled in the art, after understanding my invention, that various changes may be made therein without departing from the scope thereof. I aim in the appended claims to cover all such modifications or changes.

I claim as my invention:

1. In an aircraft cabin adapted to be supercharged above the ambient atmospheric pressure, supercharging means, comprising a blower, at least one outlet valve for discharging vitiated air from the cabin, a servomotor adapted to control said valve, a regulator operative to actuate said motor in response to any departure of cabin pressure from a value functionally correlated with flight altitude pressure, means adapted to vary the functional relation between flight altitude pressure and cabin pressure, means adapted to govern the flow of supercharging air into said cabin, means adapted to adjust the said regulator to a set equalizing altitude above which supercharging begins and below which supercharging ceases, means adapted to limit and delay the response of said motor to excessive or sudden variations of the functional relation of flight altitude, means adapted to govern the flow of supercharging air from said cabin, and means for assuming manual control of said valve in event of failure of said motor.

2. In an aircraft, a cabin pressure regulating device for controlling cabin pressure altitude at a reduced ratio from flight pressure altitude, said device including in operative combination at least two coacting pressure sensitive units, the first being responsive to cabin pressure and the second being responsive to both cabin pressure and flight pressure, a servo system for controlling cabin air flow, means for transmitting the effect of pressure reactions of said coacting units to said servo system for controlling said ratio, and means for retarding the sensitivity of the second said unit to flight pressure, whereby sudden flight pressure variations are prevented from causing corresponding sudden cabin pressure variations.

3. In an aircraft, a cabin adapted to be supercharged, a ramming air intake duct leading to said cabin, a supercharging blower adapted to increase the pressure of the incoming air, an outlet valve adjustable to vary the cabin pressure with relation to the incoming blower pressure, a regulating device sensitive to pressure differences between flight altitude pressure and cabin pressure and adapted to control said outlet valve to maintain a predetermined ratio between cabin pressure and flight altitude pressure, as gauged from a set equalizing altitude pressure, a servomotor for operating said outlet valve, said servomotor being actuated in response to pressure variations in said regulating device, a second servomotor for varying the delivery of the supercharger blowers if the valve is unable to adequately control the pressure differential, means within the outlet valve to control the second said motor, and an adjustable lag means for preventing rapid changes in flight altitude pressure from effecting a change in cabin pressure at a rate too rapid for physiological comfort, said lag means comprising a valve for restricting the connection between flight altitude pressure and the said regulating device.

4. In an aircraft, a cabin pressure regulating device for controlling cabin pressure altitude at a reduced ratio from flight pressure altitude, said device including in operative combination at least two coacting pressure sensitive units, one unit being responsive to changes in cabin pressure, the other responsive to changes in the difference between cabin pressure and flight pressure, means for controlling cabin air flow, means for transmitting the effect of pressure reactions of said coacting units to said control means for controlling said ratio, a rate of climb regulating means for limiting the rate of decrease or increase of cabin pressure, and means for setting the limiting rates, the rate of climb regulating means being adapted to override the controlling influence of said coacting pressure sensitive units upon said control means, thereby preventing pressure change in the cabin at a rate in excess of the set limiting rates.

5. In an aircraft, a cabin adapted to be supercharged, at least one blower for supercharging said cabin, at least one outlet valve for controlling the amount of supercharging, an automatic regulator for controlling said outlet valve, the regulator comprising a pair of pressure sensitive coacting units, one unit being responsive to cabin pressure, the other responsive to changes in the difference between cabin pressure and flight pressure whereby a pressure differential is obtained between flight altitude pressure and cabin pressure, the said differential being controlled by the opening and closing of said outlet valve in response to pressure reactions of the said coacting units, and a lag means comprising a rate of climb meter sensitive to cabin pressure, said climb meter acting, in event of rapid changes in flight altitude pressure such as rapid climb or descent, to override the control of the regulator with respect to said outlet valve and prevent a similarly rapid change in cabin pressure by limiting the cabin pressure change to a set rate compatible with physiological comfort.

6. In an aircraft, a cabin adapted to be supercharged, a ramming air intake duct leading to the cabin, at least one blower adapted to increase the pressure of the incoming air, an outlet valve adjustable to vary the cabin pressure with respect to the incoming blower pressure, a regulating device sensitive to pressure differences between flight altitude pressure and cabin pressure and adapted to control said outlet valve to maintain a predetermined ratio between cabin pressure and flight altitude pressure as gauged from a set equalizing altitude pressure, a servomotor actuated in response to pressure variations in said regulating device, said servomotor operating said outlet valve, a second servomotor for varying the delivery of the said supercharging blower, means within the said outlet valve for controlling the second said servomotor, a valve means controlling the reaction of flight pressure upon the said regulating device whereby the rapidity of cabin pressure changes may be varied or halted with respect to flight altitude pressure changes, and a rate of climb meter adapted to control the rate of decrease or increase of cabin pressure irrespective of the rate of flight altitude pressure decrease or increase, such control being accomplished by overriding the influence of the said regulating device in the control of said servomotor operating said outlet valve.

7. A cabin pressure regulating device comprising an adjustable dial for setting an altitude at which cabin pressure will be equalized with flight pressure, a pair of spaced contacts, a pair of coacting pressure sensitive units, a lever pivotally connected to said pressure sensitive units and adapted for contacting either or neither of said spaced contacts, and means connected with the said dial for relatively adjusting the said contacts and lever, the combination being responsive to cabin pressure and flight pressure and operative to maintain the cabin pressure substantially at a ratio of equalizing pressure minus flight pressure to equalizing pressure minus cabin pressure.

8. A cabin pressure regulating device comprising an adjustable dial for setting an altitude at which cabin pressure will be equalized with flight pressure, a pair of spaced contacts, a pair of pressure sensitive units, a lever connecting the sensitive units and a lever indirectly connected to the first said lever and adapted to contact either or neither of the said spaced contacts, and a third lever adapted to move relatively to the first said lever and the second said lever, for the purpose of changing the fulcrum of the first said lever as it moves, whereby the effect of reactions of the said pressure sensitive units may be varied with respect to the second said lever moving between the spaced contacts, the combination being sensitive to cabin pressure and flight pressure and operative to maintain the cabin pressure at a predetermined ratio to the flight pressure as gauged from a set equalizing pressure.

9. In an aircraft, a cabin adapted to be supercharged and having an outlet, blower means for supplying air to said cabin at a pressure higher than that of the ambient flight atmosphere, air flow control means for varying the cabin pressure, rate of climb regulator means to govern the rate of decrease or increase of cabin pressure, means for varying the rate of decrease or increase as governed by said regulator means, means for limiting cabin pressure to a set pressure altitude, means for varying the said pressure altitude, and a servo system operative upon said airflow control means and responsive to said regulator means and said pressure limiting means to control the said air flow.

10. In an aircraft, a cabin adapted to be supercharged and having an outlet, a blower for supplying air to said cabin at a pressure higher than that of the ambient flight atmosphere, a valve in said cabin outlet, a rate of climb meter sensitive to cabin pressure, means for adjustably setting said meter to govern the rate of decrease or increase of cabin pressure, an altimeter sensitive to cabin pressure, means for adjustably setting a limiting cabin pressure, and a servo system responsive to said climb meter and said altimeter for opening and closing said outlet valve, thereby controlling the pressure in said cabin in accordance with the settings of said climb meter and said altimeter.

11. In an aircraft, a cabin adapted to be supercharged and having a controllable outlet, a blower for supplying air to said cabin at a pressure higher than that of the ambient flight atmosphere, a rate of climb meter sensitive to cabin pressure and having adjustable means for setting a cabin pressure rate of decrease and increase, a primary servo system responsive to said rate of climb meter for opening anr closing said controllable outlet, thereby controlling cabin pressure rate of decrease and increase, an altimeter sensitive to cabin air pressure and having adjustable means for setting a limiting cabin pressure altitude, and a secondary servo system responsive to said altimeter for overriding said primary system when the cabin has attained the set pressure altitude.

12. In combination with an aircraft pressure cabin, means to supply air under pressure within the cabin, normal means to regulate and vary the pressure therein automatically under the influence of and generally in accordance with change of external pressure, auxiliary means, including a rate-of-pressure-change element, operable automatically under the influence of change of cabin pressure to overrule said normal means and to limit the rate of pressure change, and means always operable to overrule the normal means and the auxiliary means to limit the pressure difference between cabin pressure and external pressure to a preselected one.

13. Mechanism for controlling change of pressure within an aircraft cabin, comprising means operable to create and control a difference of pressure within the cabin over the external pressure, an air chamber within said cabin having a restricted opening in it, a wall movable under the influence of a pressure difference internally and externally of the air chamber, due to a change of pressure within the cabin at a rate in excess of the capability of the restricted chamber opening to relieve the pressure within the air chamber, and means operatively associated with said movable wall, and operatively connected to said first means to govern its operation for limiting the rate of pressure change within the cabin.

14. Pressure control means for a chamber exposed to varying exterior pressures, comprising valve means communicating the interior of said chamber with the exterior thereof, a motor for operating said valve means, and a rate of pressure change device in said chamber comprising a pressure sensitive element having one side thereof in direct communication with the pressure within said chamber and the other side thereof in restricted communication with said chamber pressure, whereby, upon a predetermined rate of change of pressure within said chamber, said element is actuated to energize said motor to operate said valve means to close communication between the interior and exterior of said chamber.

15. In an aircraft cabin, a vent valve, a motor for operating said valve, first pressure-sensitive means responsive to cabin pressure on one side and sub-atmospheric pressure on its other side operatively connected to actuate said motor, second pressure-sensitive means responsive to cabin pressure on one side and to atmospheric pressure on its other side also operatively connected to actuate said motor, and pressure-responsive means having one side thereof directly subjected to cabin pressure and the other side thereof in restricted communication with said cabin operatively connected to said motor to override said first and second means when cabin pressure changes at excessive rates during changes in the altitude of flight.

16. Mechanism for regulating the pressure within an aircraft body for high altitude flights, and adapted to be sealed at high or medium altitudes against escape of pressure from within, under the influence of a pressure differential above the ambient pressure at such altitudes, comprising means operable to create such a pressure differential within the sealed cabin, a rate-of-pressure-change element responsive to change of pressure within the cabin, means operable at will, in anticipation of a change in altitude, and consequent change in cabin pressure, to induce a change in cabin pressure for altering such pressure differential, independently of the rate of change of the ambient pressure, due to change or lack of change of altitude, and means controlled by said rate-of-change element for governing said inducing means to limit the rate of change of pressure within the cabin during such inducing operation.

17. Mechanism to control aircraft cabin pressures, in combination with means to supply air under pressure to the cabin, differential-pressure responsive means operable at all altitudes to prevent the cabin pressure exceeding a selected pressure above the external pressure, absolute-pressure responsive means subject to cabin absolute pressure operable at a selected altitude to maintain cabin pressures substantially constant, up to the limit of differential pressure set by the differential-pressure responsive means, and means operable at will, and overriding the absolute-pressure responsive means, but subject to the limiting control of the differential-pressure responsive means, to effect or control the rate of change of cabin pressure.

18. Mechanism to control aircraft cabin pressures, comprising, in combination with means to supply air under pressure to the cabin, a normal automatic control system including an absolute-pressure responsive means automatically operable at a selected altitude to initiate an increase of cabin pressure relative to external pressure, and a differential-pressure responsive means automatically operable at all altitudes to prevent increase of cabin pressure beyond a selected differential over external pressure, and therefore at a given altitude imposing a maximum limit on the increase initiated by the absolute-pressure responsive means, and controlling cabin pressures at altitudes above such given altitude, and further in combination therewith a manual control system including means to override at will the absolute-pressure responsive means and to initiate a change of cabin pressure, whether rise or fall, independently of altitude, but arranged to be limited by the differential-pressure responsive means, whereby the differential limit set by the latter is never exceeded by the manual control system nor by the automatic control system.

19. Mechanism to control aircraft cabin pressures, comprising, in combination with means to supply air under pressure to the cabin, and an outlet to discharge air from the cabin, valve means operable to control air movement through and pressure within the cabin, means operable automatically, to operate said valve means to maintain a substantially constant cabin pressure, differential-pressure responsive means operable automatically at all times upon the attainment of a selected differential of cabin pressure above external pressure for limiting such differential to the selected value, and means manually operable at all times to operate said valve means to decrease outflow and thereby to increase cabin pressure above such substantially constant value, or to increase outflow and thereby to decrease cabin pressure below such substantially constant value, between a lower limit fixed by the external pressure, and an upper limit fixed by said differential-pressure responsive means, and at a selected rate of pressure change.

20. In combination with an aircraft pressure cabin, normally operable means to maintain the pressure therein substantially equal to external pressure up to a selected altitude, to substantially maintain within the cabin a pressure corresponding to such selected altitude during flight between that altitude and a selected higher altitude, and to maintain substantially the attained differential of cabin pressure over ambient pressure during flight above the second selected altitude, and auxiliary control means operable to limit the rate of cabin pressure change in flight from a higher to a lower altitude, or vice versa, independently of and regardless of the rate of cabin pressure change which would otherwise be imposed by the normal control means at the rate of descent or ascent chosen.

21. In combination with an aircraft pressure cabin, normally operable means to maintain the pressure therein substantially equal to external pressure up to a selected altitude, to substantially maintain within the cabin a pressure corresponding to such selected altitude during flight between that altitude and a selected higher altitude, and to maintain substantially the attained differential of cabin pressure over ambient pressure during flight above the second selected altitude, auxiliary control means operable to limit the rate of cabin pressure change in flight from a higher to a lower altitude, or vice versa, independently of and regardless of the rate of cabin pressure change which would otherwise be imposed by the normal control means at the rate of descent or ascent chosen, and means to adjust the auxiliary control means to select and effect control at different rate of pressure change.

22. In combination with an aircraft pressure cabin structure having a known resistance to bursting under the influence of a higher pressure internally than externally, means to supply air under pressure within the cabin, means operable to control and produce a pressure differential of cabin pressure over external pressure, a rate-of-pressure-change control to govern the action of the pressure controlling means, and thereby to govern the rate of pressure change within the cabin, regardless of change or rate of change of external pressure, and a differential-pressure control means operative to limit the pressure difference possible of attainment to a safe value within the bursting strength of the cabin structure.

23. Mechanism for controlling change of pressure within an aircraft cabin, comprising pressure-responsive means operable automatically to effect a change of cabin pressure, and thereby to establish a pressure differential between the pressure within the cabin and the exterior atmospheric pressure, and a rate-of-pressure-change element responsive to rapid change of pressure within the cabin and operatively connected to the differential-establishing means, whereby upon such rapid rate of pressure change it is automatically operable to retard the action of said pressure-responsive means, thereby to limit the rate of pressure change within the cabin.

24. Mechanism to control aircraft cabin pressure, comprising, in combination with means to supply air under pressure to and to discharge air from the cabin, three pressure responsive means, one whereof is sensitive to the pressure differential of cabin pressure over external pressure, and always operable to prevent such differential exceeding a selected value, the second operable to regulate cabin pressure within the differential thus determined, and the third being sensitive to rate of pressure change, to restrict any change of pressure, within the predetermined differential, automatically to a predetermined rate, independently of the rate of air supply to or discharge from the cabin or the actual difference between cabin pressure and external pressure or the rate of change of such difference.

25. Mechanism to control aircraft cabin pressure, comprising, in combination with means to supply air under pressure to and to discharge air from the cabin, three pressure responsive means, one whereof is sensitive to the pressure differential of cabin pressure over external pressure, and always operable to prevent such differential exceeding a selected value, the second operable to regulate the cabin pressure within the differential thus determined, and the third being sensitive to rate of pressure change, to restrict any change of pressure, within the predetermined differential, automatically to a predetermined rate, independently of the rate of air supply to or discharge from the cabin or the actual difference between cabin pressure and external pressure or the rate of change of such difference, and means to adjust said third pressure responsive means, to preselect any one of various rates of pressure change.

26. Mechanism to control aircraft cabin pressures, comprising, means to supply air under pressure within the cabin, differential-pressure responsive means always operable to prevent the cabin pressure exceeding a selected pressure above the external pressure, and settable means sensitive to rate of pressure change within the cabin, operable to effect change of cabin pressure, within the limiting differential fixed by said differential-pressure responsive means, at a preselected rate which is independent of all factors other than rate of supply.

27. In combination with an aircraft body capable of flight at high altitudes, and having a cabin structurally formed to resist an allowable pressure difference between cabin pressure and external pressure, which pressure difference is not in excess of a fraction of the total pressure difference between sea level and the aircraft's ceiling, means operable to create a pressure differential within the cabin, not greater than the structurally allowable pressure difference, an element subject to cabin pressure, and sensitive to rate of change thereof, and means operable in response to the rate-of-pressure-change element to prevent pressure change in response to said first means at a rate in excess of a predetermined rate.

28. In combination with an aircraft capable of flight at high altitudes, and having a cabin structurally formed to resist an allowable pressure difference between cabin pressure and external pressure which is not in excess of a fraction of the total pressure difference between sea level and the aircraft's ceiling, means to supply air under pressure within and continuously to discharge such air from the cabin, to decrease such pressure difference, means to control the cabin pressure to substantially maintain it at a value which, with relation to external pressure, is not greater than the allowable pressure difference, and means operable to regulate the rate of pressure change within the cabin, regardless of whether such change occurs by reason of ascent or descent, and consequent change of external pressure, or by reason of change in the rate of supply of air under pressure, or by reason of change in the rate of discharge of air from the cabin.

29. A pressure control device for controlling the pressure in the cabin of an aircraft comprising, in combination, means forming a port, a valve member movable relative to said port-forming means for controlling flow of fluid through said port, a bellows held stationary at one end and connected at its other end to a movable connecting element, a second bellows connected at one end to said movable connecting element and having at its other end an operative association with said valve element such that movement of said other end controls the movement of said valve element, means for subjecting the exterior of both of said bellows to cabin pressure, and means for subjecting the interior of one of said bellows to ambient pressure, the other bellows being evacuated.

30. A pressure control device for controlling the pressures in the cabin of an aircraft comprising, in combination, means forming a port, a valve member movable relative to said port-forming means for controlling flow of fluid through said port, a bellows held at one end stationary and connected at its other end to a movable element, an evacuated bellows connected at one end to said movable element and operatively connected at its other end to said valve member, means for subjecting the exterior of both of said bellows to cabin pressure, and means for subjecting the interior of said first bellows to ambient flight pressure.

31. A pressure control device comprising, in combination, a port, a valve seat surrounding said port, a valve member cooperating with said valve seat for controlling the flow of fluid through said port, and pressure responsive means for controlling the operation of said valve member, said pressure responsive means including a pressure responsive member operatively connected to said valve member and subjected on one side to the pressure at one side of said valve seat and on its opposite side to a subatmospheric pressure, and a second pressure responsive member connected to said first pressure responsive member and acting through the latter on said valve member, said second pressure responsive member subjected continuously on opposite surfaces thereof to the pressures at opposite sides of said valve seat.

32. In a device for controlling the cabin pressures of an aircraft, valve means adapted to vent the cabin interior, means for controlling said valve means, a device responsive to cabin pressures and operative on reduction of cabin pressure to a value corresponding to a predetermined height for transmitting movement to said control means to affect control of said valve means to vary venting to seek to maintain the cabin pressure substantially constant, and a device responsive to the differential in pressure between the cabin pressure and the exterior pressure for actuating said means controlling said valve means and operative at a predetermined pressure differential for further transmitting movement to said valve control means to vary venting, said devices so arranged with respect to each other that one of said devices transmits its individual valve positioning movements to said valve control means through the other device, and the latter device reacts against the former when transmitting its individual valve positioning movements to said valve control means.

33. In a device for controlling the cabin pressures of an aircraft, valve means adapted to vent the cabin interior, pressure responsive means operative on reduction of cabin pressure to a value corresponding to a predetermined altitude for actuating said valve means to vary venting to seek to maintain the cabin pressure substantially constant, and a second pressure responsive means responsive to the differential in pressure between the cabin pressure and the exterior pressure for further actuating said valve means to vary venting, each of said pressure responsive means embodying an expansible chamber control device, one operatively connected to said valve means and the other device yieldingly connected to operate said valve means through the first device, one of said control devices having one side thereof subjected to the cabin pressure and the opposite side to a subatmospheric pressure and said other control device having one side thereof subjected to cabin pressure and its opposite side subjected to atmospheric pressure.

34. A sealed cabin for an aircraft provided with valve means communicating the interior of the cabin with the exterior thereof, and means comprising a pressure sensitive element having one side thereof in direct communication with said cabin pressure and an opposite side thereof in restricted communication with said cabin pressure responsive to and actuated during a predetermined rate of change of pressure within said cabin during a rapid rate of climb or descent of said craft when said valve means is open for operating said valve means to close communication between the interior and exterior of said cabin.

35. Mechanism for controlling change of pressure within an aircraft cabin, comprising means operable to create and control a difference of pressure within the cabin over the external pressure, an air chamber within said cabin having a restricted opening in it, a wall movable under the influence of a pressure difference internally and externally of the air chamber, due to a change of pressure within the cabin at a rate in excess of the capability of the restricted chamber opening to relieve said pressure difference, and means operably associated with said movable wall to determine limits within which the rate of pressure change in the cabin is to be held.

36. An aircraft compartment having blower means therefor, valve means communicating the interior of the compartment with the exterior thereof, control means for operating said valve means to maintain the pressures within the compartment at predetermined values with respect to varying exterior pressures, and means having one side thereof in direct communication with the compartment pressure and an opposite side thereof in restricted communication with the compartment pressure operative during a predetermined rate of change of pressure within said compartment when the compartment interior and exterior are in communication for controlling said valve means independently of said control means.

37. An aircraft compartment having blower means therefor, valve means communicating the interior of the compartment with the exterior thereof, control means for operating said valve means to maintain the pressures within the compartment at predetermined values with respect to varying exterior pressures, and a rate of change of pressure device having one side thereof in direct communication with the compartment pressure and an opposite side thereof in restricted communication with the compartment pressure operative during a predetermined rate of change of pressure within said compartment when the compartment interior and exterior are in communication for closing said valve means.

38. Pressure control means for a chamber exposed to varying exterior pressures, comprising valve means communicating the interior of said chamber with the exterior thereof, and means comprising a resilient member having one side thereof in direct communication with said chamber pressure and an opposite side thereof in restricted communication with said chamber pressure responding to a predetermined rate of pressure change within said chamber when said chamber interior and exterior are in communication for operating said valve means to close communication between the interior and exterior of said chamber.

39. Pressure control means for a chamber exposed to varying exterior pressures, comprising valve means communicating the interior of said chamber with the exterior thereof, and means including a compressible and expansible member having the inside thereof in restricted communication with the chamber pressure and the outside thereof in direct communication with the chamber pressure responding to a predetermined rate of pressure change within said chamber when said chamber interior and exterior are in communication for operating said valve means to close communication between the interior and exterior of said chamber.

40. An aircraft having a compartment provided with valve means communicating the interior of the compartment with the exterior thereof, a reversible motor for operating said valve means, and means including a pressure sensitive resilient member having one side thereof in direct communication with the pressure within said chamber and the other side thereof in restricted communication with said chamber pressure, whereby, upon a predetermined rate of pressure change within said chamber during a rapid rate of climb of said craft, said member is actuated to energize said motor to operate said valve means to close communication between the interior and exterior of said compartment.

41. An aircraft having a compartment provided with valve means communicating the interior of the compartment with the exterior thereof, and means including a pressure sensitive element having one side thereof in direct communication with the pressure within said compartment and the other side thereof in restricted communication with said compartment pressure, whereby, upon sudden chamber pressure decrease causing a predetermined rate of change of pressure within said compartment during a rapid rate of climb of said craft, said element is actuated in one direction to operate said valve means to close communication between the interior and exterior of said compartment, and whereby, upon a sudden compartment pressure increase causing a predetermined rate of change of pressure within said compartment during a rapid rate of descent of said craft, said element is actuated in a second direction to operate said valve means to likewise close communication between the interior and exterior of said compartment.

42. An aircraft sealed compartment having blower means therefor, valve means communicating the interior of the compartment with the exterior thereof, electrical means for said valve means, control means for energizing said electrical means to actuate said valve means to maintain the pressure within said compartment in a predetermined relation with respect to the pressure exterior of said compartment, and means comprising a resilient member having one side thereof in direct communication with said compartment pressure and an opposite side thereof in restricted communication with said compartment pressure actuated during a predetermined rate of change of pressure within said compartment for energizing said electrical means to operate said valve means and close communication between the interior and exterior of said compartment.

43. A sealed cabin for an aircraft provided with valve means communicating the interior of the cabin with the exterior thereof, and means comprising a pressure sensitive element having one side thereof in direct communication with said cabin pressure and an opposite side thereof in restricted communication with said cabin pressure responsive to and actuated during a predetermined rate of change of pressure within said cabin during a rapid rate of climb or descent of said craft when said valve means is open for operating said valve means to close communication between the interior and exterior of said cabin.

44. In a system of pressure control for a sealed chamber, a continuously energized blower means for building up pressure in said chamber, valve means providing communication between the inside and outside of said chamber, control means within said chamber for operating said valve means to maintain the pressure within said chamber at predetermined varying values with respect to a varying exterior chamber pressure, and rate of change of pressure means including a pressure sensitive element having one side thereof in direct communication with the pressure within said chamber and the other side thereof in restricted communication with said chamber pressure, whereby, upon a predetermined rate of change of pressure within said chamber said element is actuated to operate said valve means and close communication between the interior and exterior of said chamber.

45. A sealed cabin for an aircraft having a continuously energized blower for building up pressure within said cabin, valve means for normally communicating the interior of the cabin with the exterior thereof, a reversible motor for operating said valve means, means including a pressure sensitive element responding to cabin pressure only and a second pressure sensitive element responding to the differential of the cabin pressure and the atmospheric pressure outside thereof for energizing said motor in one direction to operate said valve means when the pressure within the cabin has reached a predetermined value to close communication between the interior and exterior of said cabin, said elements being operative to energize said motor in the opposite direction opening said valve means to permit communication of the interior of said cabin with the exterior thereof when the pressure built up by said blower exceeds a predetermined amount, and means, including a pressure sensitive element subjected on one side to cabin pressure and on the opposite side to a volume of air in restricted communication with the interior of said cabin, operative during a predetermined rate of change of pressure within said cabin for energizing said motor to close said valve means.

46. An aircraft cabin pressure control system comprising means for delivering air to said cabin under a pressure greater than ambient flight pressure, a valve for discharging air from said cabin, means for operating said valve to vary the rate of air discharge from said cabin relative to the rate of air delivery to said cabin whereby the absolute pressure within said cabin may be varied, a first pressure sensitive means responsive to changes in cabin absolute pressure operatively connected to said valve operating means and adapted to actuate the same to seek to maintain cabin absolute pressure substantially constant, a second pressure sensitive means responsive to changes in the difference between cabin absolute pressure and ambient flight pressure, and means operatively interconnecting said second pressure sensitive means and said valve operating means for progressively opposing the action of said first pressure sensitive means on said operating means as ambient flight pressure decreases to thereby impose a conjoint action resulting from changes in cabin absolute pressure and cabin differential pressure on said valve operating means whereby cabin differential pressure will be controlled to change substantially inversely proportional to changes in ambient flight pressure.

47. An aircraft compartment pressure control comprising means for delivering air to said compartment under a pressure greater than ambient flight pressure, means for discharging air from said compartment, means for varying the rate of air discharge from sair compartment relative to the rate of air delivery to said compartment whereby the absolute pressure within said compartment may be varied, means, including a first capsule subject to cabin absolute pressure and a second capsule subject to cabin differential pressure coacting through an interconnecting means, made operative upon said aircraft reaching a predetermined pressure altitude for controlling said last named means for regulating the absolute pressure in said compartment in such a manner as to change said absolute pressure directly proportional to changes in ambient flight pressure, and means for preselecting the pressure altitude at which said controlling means is made operative, said preselecting means being changeable during flight of said aircraft and operable independently of said control means whereby said pressure altitude at which said control means is made operative may be altered during flight of said aircraft without altering the said proportion.

48. An aircraft compartment pressure control comprising means for delivering air to said compartment under a pressure greater than ambient flight pressure, means for discharging air from said compartment, means for varying the rate of air discharge from said compartment relative to the rate of air delivery to said compartment whereby the absolute pressure within said compartment may be varied, means, including a first capsule subject to cabin absolute pressure and a second capsule subject to cabin differential pressure coacting through an interconnecting means, made operative upon said aircraft reaching a predetermined pressure altitude for controlling said last named means for regulating the absolute pressure in said compartment in such a manner as to change said absolute pressure directly proportional to changes in ambient flight pressure.

WOLFGANG B. KLEMPERER.

REFERENCES CITED

The following references are of record in the file of this patent:

UNITED STATES PATENTS

| Number | Name | Date |
| --- | --- | --- |
| 2,208,554 | Price | July 16, 1940 |
| 2,407,257 | Del Mar | Sept. 10, 1946 |

FOREIGN PATENTS

| Number | Country | Date |
| --- | --- | --- |
| 514,055 | France | Nov. 8, 1920 |